Oct. 9, 1934.  H. H. TIMIAN  1,975,989
ENGINE
Filed March 2, 1931   3 Sheets-Sheet 1
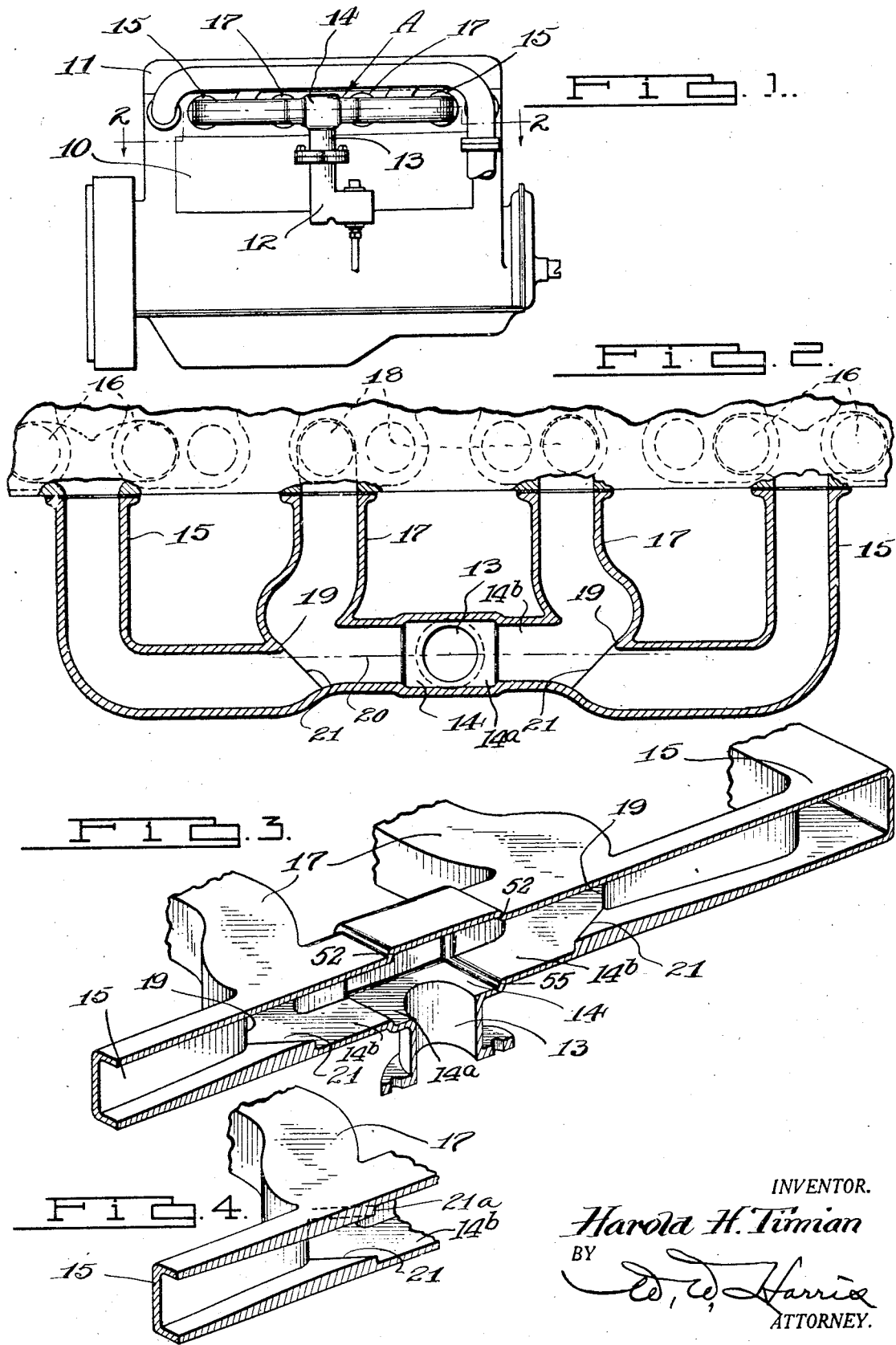
INVENTOR.
Harold H. Timian
BY
ATTORNEY.

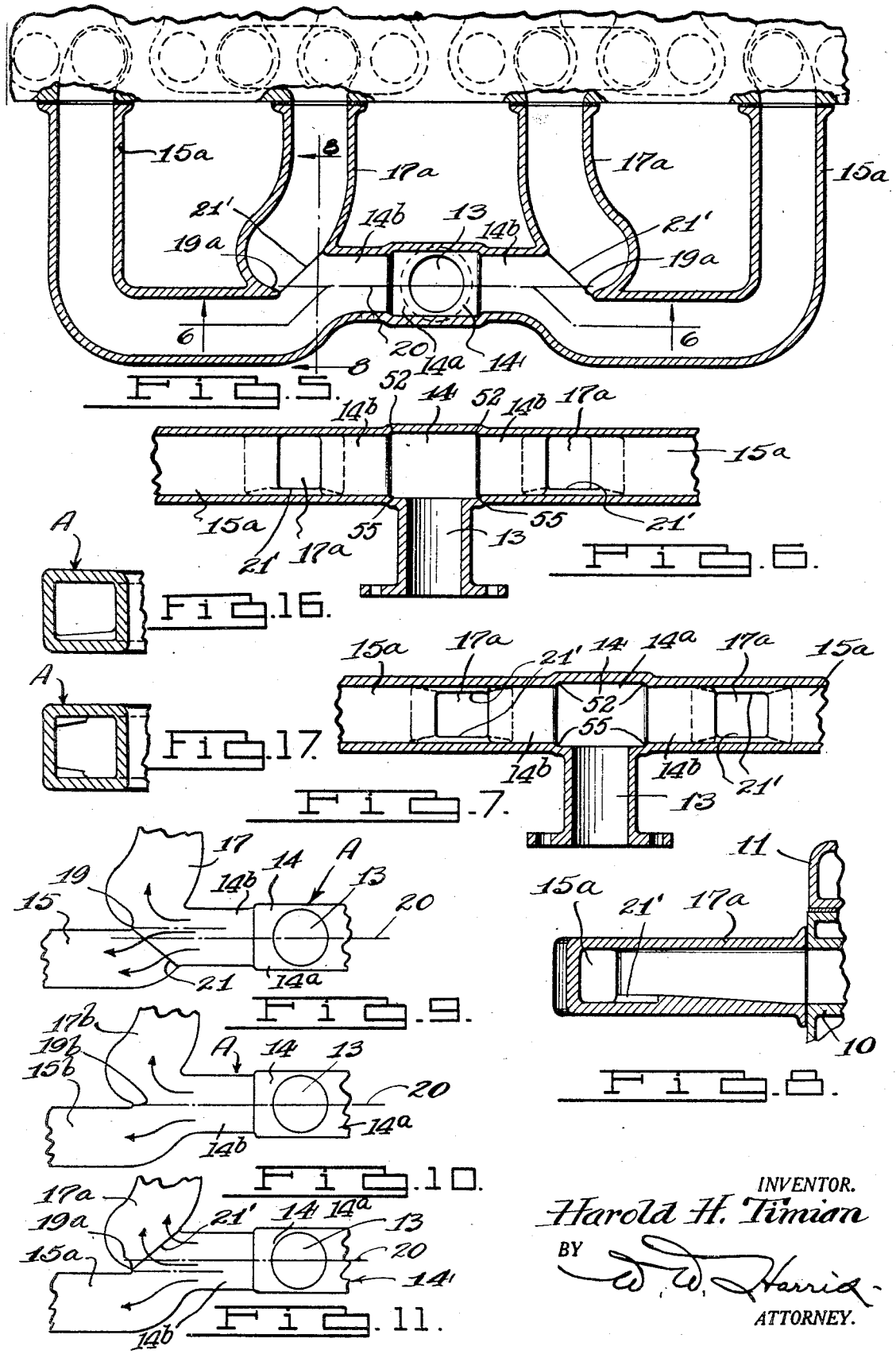

Oct. 9, 1934.   H. H. TIMIAN   1,975,989
ENGINE
Filed March 2, 1931   3 Sheets-Sheet 3
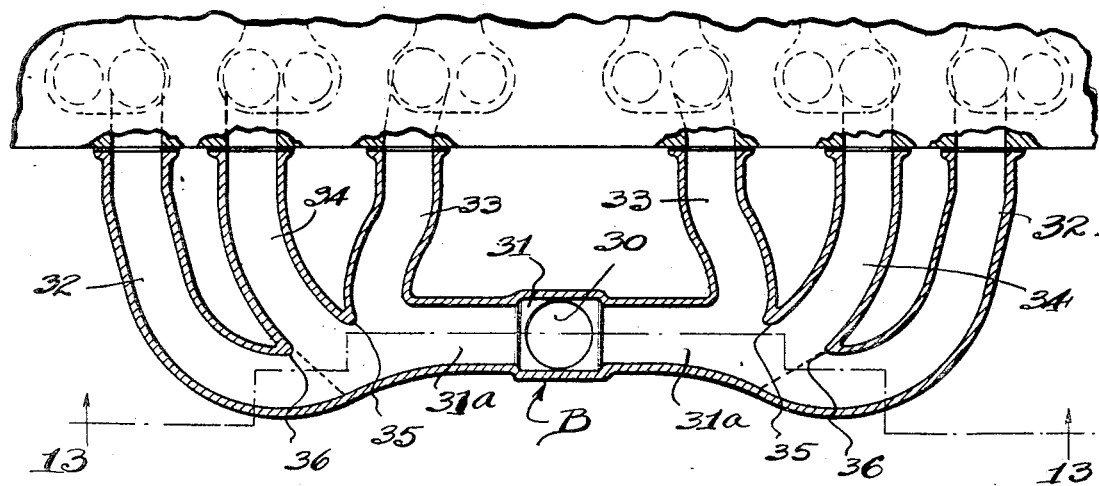
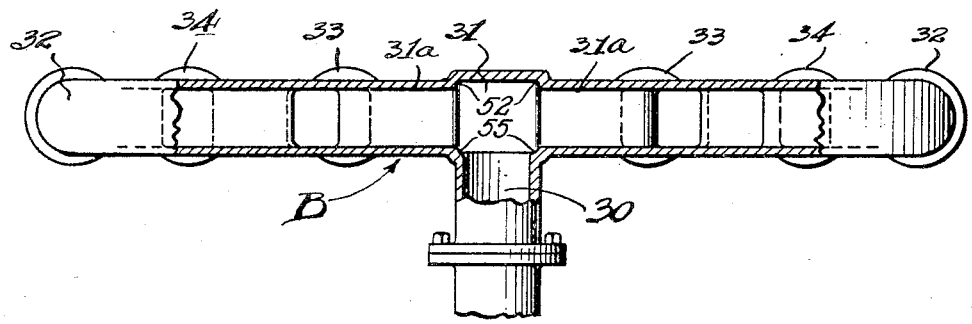
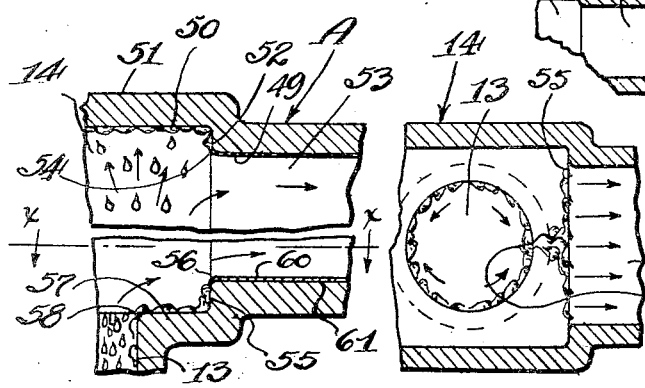
INVENTOR.
Harold H. Timian
BY
W. W. Harris
ATTORNEY.

Patented Oct. 9, 1934

1,975,989

UNITED STATES PATENT OFFICE 1,975,989

ENGINE

Harold H. Timian, Detroit, Mich., assignor to Continental Motors Corporation, Detroit, Mich., a corporation of Virginia Application March 2, 1931, Serial No. 519,636

15 Claims. (Cl. 123—52)

My invention relates to internal combustion engines and more particularly to an intake manifold structure therefor for distributing the fuel to the engine cylinders.

It is an object of my invention to increase the overall efficiencies and performance of multi-cylinder internal combustion engines by providing means for effecting a directive control of the fuel portion that remains in a liquid state and is conducted to the several outlet branches by creeping along the manifold surfaces.

Another object of my invention is to increase the operating efficiency and performance of multi-cylinder internal combustion engines by providing an intake manifold structure adapted for association therewith which is provided with means for effecting a predetermined relative distribution of a combustible fluid to the engine cylinders.

Another object of my invention is to construct a branched intake manifold structure provided with means effecting a predetermined relative distribution of the fuel and fuel mixture to the manifold branches.

Another object of my invention is to construct a branched intake manifold structure provided with means effecting a predetermined relative distribution of the fuel to the manifold branches at various engine speeds.

Another object of my invention is to construct a branched intake manifold structure for an internal combustion engine provided with fuel flow impeding means cooperatively associated with said manifold branches for effecting a predetermined relative distribution of the fuel into said manifold branches for the purpose of providing a substantially uniform fuel distribution to the engine cylinders at predetermined engine speeds.

A further object of my invention is to provide a substantially uniform fuel distribution to the engine cylinders by dividing the fuel stream in a branched intake manifold structure for effecting a predetermined relative distribution of the fuel to said manifold branches which communicate with the engine cylinders.

A further object of my invention is to provide a uniform fuel distribution in an intake manifold structure of an internal combustion engine by providing a manifold structure constructed to spread the liquid portions of the fuel mixture in a relatively thin unbroken film of substantially uniform thickness along a wall of the manifold structure.

A still further object of my invention is to increase the efficiency of engine operating performance in general by providing an intake manifold structure having means for dividing and distributing the fluid flow and including portions constructed to act on the liquid fuel and fuel mixture for establishing same in a state of equilibrium prior to the time said fluid is acted upon by said fluid flow dividing means.

For a further understanding of my invention reference may be had to the accompanying drawings illustrating certain embodiments of my invention, and in which:

Figure 1 is a side elevational view of an internal combustion engine showing an intake manifold structure attached thereto which is constructed in accordance with my invention, Figure 2 is a horizontal longitudinal sectional view of the intake manifold structure taken substantially on the line 2—2 of Figure 1, Figure 3 is a fragmentary sectional perspective view of the intake manifold structure illustrating a plurality of manifold branches and the fuel flow impeding means associated therewith for effecting a predetermined relative distribution of the fuel to said manifold branches, Figure 4 is a fragmentary sectional perspective view of a modified manifold construction showing fuel flow impeding means projecting respectively from the top and bottom walls of the manifold, Figure 5 is a horizontal longitudinal sectional view of an intake manifold structure illustrating fuel flow impeding means associated with the intermediate manifold branches instead of the end branches as shown in Figures 2 and 3, Figure 6 is a fragmentary vertical longitudinal sectional view taken on the line 6—6 of Figure 5, Figure 7 is a similar sectional view illustrating a modified manifold construction, Figure 8 is a sectional view taken on the line 8—8 of Figure 5 and illustrating in detail one of the fuel flow impeding means associated with a manifold branch portion, Figure 9 is a diagrammatic view of a portion of the manifold structure illustrating a construction in which the fuel stream is divided for diverting a greater volume of the fuel into the end branches, Figure 10 is a diagrammatic view of a portion of the manifold structure illustrating a construction in which the fuel stream is divided for diverting substantially equal volumes of the fuel into adjacent manifold branches, Figure 11 is a similar diagrammatic view illustrating a construction in which the fuel stream is divided for diverting a greater volume of the fuel into an intermediate manifold branch, Figure 12 is a horizontal longitudinal sectional view of a finger type intake manifold structure illustrating a construction in which the fuel stream is divided for effecting a predetermined relative distribution of the fuel into adjacent manifold branches, Figure 13 is a vertical longitudinal sectional view of the modified construction shown in Figure 12 and taken substantially on the line 13—13 of Figure 12, Figure 14 is an enlarged sectional view illustrating the means for spreading the fuel mixture in a relatively thin film of uniform thickness over one or more walls of the manifold header, Figure 14A is a plan sectional view taken on the line X—X of Figure 14, Figure 15 is a fragmentary vertical sectional view illustrating a modified manifold construction, Figure 16 is a transverse sectional view through a portion of the manifold structure showing a modified construction in which the fuel flow impeding means or dam is inclined with respect to the manifold wall from which said dam projects, and Figure 17 is a sectional view showing a further modified construction in which the fuel flow impeding means or dam extends only part way across that manifold for partially impeding the fuel flow.

My novel intake manifold structure designated in its entirety by the reference character A is adapted for association with an internal combustion engine, which in general includes a cylinder block 10 to which a cylinder head structure 11 is secured in the usual way. A fuel mixture forming device or carburetor 12 is associated with said engine, and communicates with the primary fuel mixture conducting portion or manifold riser 13. Obviously, a down draft carburetor may be employed if so desired and I wish it understood that I use the term "riser" in its broad sense as a fuel mixture conducting means connecting the carburetor outlet with header portion 14 of the manifold structure, whether a carburetor as shown or a down draft carburetor is employed.

The header portion 14 may be termed a lateral fuel mixture conducting portion communicating with the primary fuel mixture conducting portion and preferably includes a chamber 14a adjacent the junction of said lateral and primary conducting portions and a conduit portion 14b extending substantially longitudinally of the engine, this conduit being substantially uniform in cross-sectional area. Said conduit and chamber are preferably connected by a shoulder 55 for a purpose that will later be made apparent, this shoulder preferably extending transversely of the lateral conducting portion as shown in the drawings. Preferably, the lateral and branch fuel mixture conducting portions are constructed rectangular in cross-section and are provided with substantially flat floors, any wet fuel precipitate being carried along this flat floor principally at relatively low speed or low load engine operation.

The manifold structure as specifically illustrated in Figures 2 and 3 and diagrammatically in Figure 9 is provided with a plurality of manifold branch conducting portions, each of the end branches 15 being shown in communication with a pair of intake valve means 16 associated with a pair of cylinders, (not shown) while the intermediate branches 17 are shown in communication with a single intake valve means 18 associated with a single cylinder (not shown). The above described arrangement necessitates a greater flow of fuel into the end branches 15 than into the intermediate branches 17 in order that the engine cylinders will all be supplied with substantial uniform amounts of combustible fluid. Thus, to proportionately divide the stream of combustible fluid flowing into adjacent branches 15 and 17, I have provided means 19 pointed or overlapping the conduit in the direction of the fuel stream, which is sometimes referred to as a "split". A greater volume of fuel must be supplied to the end branch 15 because two cylinders communicate therewith but in order to divert the proper amount of fuel into the adjacent intermediate branch 17, the means or "split" 19 is located to the inside of the longitudinal axial plane 20 of the header portion 14, said means 19 being preferably located so as to divert approximately one-third of the combustible fluid into the intermediate branch 17 and two-thirds of the combustible fluid into the end branch 15.

However, at low engine speeds the heavier fuel particles are carried along on the floor of the manifold and because of increased suction impulses in branch 15 a proportionally greater relative volume of these wet particles tend to flow into branch 15. Therefore in order to effect a uniform distribution of the fuel to the cylinders communicating with the manifold branches 15 and 17, I provide fuel flow impeding means cooperating with the split 19 for partially impeding the flow of the wet particles moving along the floor of the manifold structure to effect a predetermined relative distribution of the fuel flow into said branches 15 and 17. Preferably, this fuel flow impeding means is constructed as a dam 21 projecting upwardly from the floor of the manifold structure, and is preferably positioned substantially at the mouth of the manifold branch portion 15. Thus some of the wet particles moving along the floor of the manifold structure which tend to flow into the branch 15 are diverted or deflected into branch 17. The height of the fuel flow impeding means or dam 21 may be determined by actual tests so as to obtain a proper distribution of the fuel and if found desirable the dam may be constructed with a variable height so as to provide a variable impeding means for various engines speeds in the low speed range of the engine. Normally, I find it desirable to provide such fuel flow impeding means arranged to act on the fuel for engines speeds of approximately 200 to 800 revolutions per minute. Obviously various engines may require such fuel flow impeding means of various dimensions so I do not limit myself to any specific dimension, or to that shown in the drawings which illustrate the principle of my invention as embodied in an engine chosen merely for the purposes of illustration.

In order to accurately control the dividing of the stream of combustible fluid by the split 19 and the dams 21, it is important that the stream of combustible fluid be in a state of equilibrium. In my present invention, the wet or liquid fuel stream is established in a state of equilibrium by means of the shoulder 55 intermediate the chamber and conduit 14a and 14b respectively. The wet fuel is thus caused to flow through the conduit in a substantial uniform film. The fuel mixture is established in a state of equilibrium in the conduit 14b, the said conduit having a length permitting the fuel mixture to attain equilibrium prior to being acted upon by the combustible fluid dividing means.

When desired, fuel flow impeding means such as a dam or other obstruction 21ᵃ preferably constructed may be provided adjacent the roof of the manifold structure (see Figure 4), said dam or obstruction 21ᵃ being also preferably constructed to lie transversely across the mouth of branch 15. This fuel flow impeding means or dam 21ᵃ is arranged to impede the flow into branch 15 of wet particles of the fuel mixture which are caused to move along the roof of the manifold structure when the engine is operated at maximum or near maximum speed. Thus, the dam 21ᵃ is brought into operation at high engine speeds since the wet fuel mixture creeping along the roof is subjected to the same influences as the fuel mixture creeping along the floor. In some cases it may be desirable to construct the dam adjacent the roof of the manifold structure and not on the floor, these various arrangements depending on various conditions and engine loadings. Furthermore, when desirable the fuel flow impeding means may be constructed to extend only part way across the manifold branch, when only a partial impediment to the flow of the wet fuel mixture is desirable. Figure 16 shows a sloping dam and Figure 17 shows a dam which extends part way across the branch for partially impeding the fuel mixture flow.

It may be further noted that the roof is provided with a shoulder 52 similar in construction and operation as the shoulder 55 in order to establish the wet or liquid fuel moving along the roof in a state of equilibrium in order that distribution of same can be properly and accurately controlled.

In Figures 5 to 8 inclusive and 11 the manifold branch 17ᵃ communicates with a greater number of cylinders than the manifold branch 15ᵃ, and as shown in the illustrated embodiment (Figure 5) the branch 17ᵃ communicates with two intake valve means associated with two cylinders (not shown) while the branch 15ᵃ communicates with a single valve means associated with a single cylinder (not shown). The fuel stream dividing means or "split" 19ᵃ is positioned to the outside of longitudinal axial plane 20 through the header to divert substantially two-thirds of the fuel mixture into branch 17ᵃ and substantially one-third of the fuel into branch 15ᵃ (see Figure 11). This manifold is also provided with shoulders 52 and 55 to establish the liquid fuel in a state of equilibrium and the conduit 14ᵇ is constructed of a length to permit the fuel mixture to attain equilibrium in a manner similar to manifold shown in Figs. 1 to 3 inclusive.

In order to counteract the tendency of the heavier wet particles of fuel mixture which creep or move along the floor or roof of the manifold structure at low and high engine speeds respectively, to flow into the branch 17ᵃ in greater amounts than is desirable I construct a dam 21′ across the mouth of branch 17ᵃ. The shape and dimensions of dam 21′ are determined by the type of engine and the general structure of the manifold associated therewith.

For some engines a manifold constructed as shown in Figure 10 may be found desirable in which the fuel stream is divided to divert substantially equal quantities of the fuel into the branches 15ᵇ and 17ᵇ, the fuel dividing means or "split" 19ᵇ being substantially located in the longitudinal axial plane 20 of the manifold header or conduit 14ᵇ.

It will be noted that these manifold branches may be each arranged to communicate with one or more cylinders. In fact some branches may communicate with more than two cylinders in some cases. Also, the branches may be arranged to each communicate with a single cylinder, in which case it is frequently found desirable to provide fuel flow impeding means or dams at the floor, or roof, or both in order to effect a predetermined relative distribution of the fuel.

The manifold structures herein illustrated are adapted to be employed with an engine having six cylinders and though the principles of my invention may be incorporated in engines having 4, 8 or more cylinders, the illustrated structures definitely solve a difficult problem of fuel distribution for six cylinder engines.

The manifold structure B illustrated in Figs. 12 and 13 consists of a primary fuel mixture conducting portion or riser 30, a header or chamber portion 31, a lateral runner portion 31ᵃ, end branch portions 32; inner branch portions 33, and middle branch portions 34, each of said branches being adapted for communication with a single cylinder. It will be noted that the stream of combustible fluid flowing towards the end three adjacent cylinders is divided in such a way that each branch receives approximately the same quantity of such fluid, i. e., branch 33 receives one-third, branch 34 receives one-third, and branch 32 receives one-third. It will be noted that I have provided means for dividing the fuel stream, such as the "split" 35 located intermediate branches 33 and 34, and the "split" 36 intermediate the branches 34 and 32. The fuel mixture stream is successively split and divided so that the fuel is diverted into successive branches. If any one of these branches are found to obtain a richer fuel mixture at either high or low engine speeds, dams or other suitable fuel flow impeding means may be employed if so desired, said fuel flow impeding means taking any desired form but preferably taking a form illustrated in the accompanying drawings, showing various embodiments of my invention.

In some cases I find it desirable to provide stepped fuel flow impeding means or dams, one embodiment being shown in Figure 15. Such an arrangement as this is preferably employed in a manifold structure having more than two branches, and these fuel flow impeding means or dams 40 and 41 may be constructed of different heights if so desired, one or both may slope transversely of the manifold passage, and one or both may extend only part way across, and be positioned on the floor or roof or both.

It will be noted that the manifold structures herein illustrated comprise a primary conducting portion or riser, a header or chamber communicating with the riser, one or more lateral fuel mixture conducting portions or runners communicating with the header, and manifold branches communicating with the runners. The liquid fuel in the chamber or header is first established in a state of equilibrium and then the fuel mixture is conducted through the runners or conduits of such length as to permit the fuel mixture to attain equilibrium therein to a point remotely located with respect to said chamber where means are provided for effecting a predetermined distribution of the fuel mixture in said branches.

A further feature of my invention incorporated in all forms which are herein illustrated is the construction of the header and associated manifold branch portions in which is provided a minimum of resistance to the fuel flow. It will be noted that the header is in all cases substantially straight and the branches are so arranged and connected with the header as to minimize as much as possible any abrupt turns, thereby minimizing frictional resistance. My manifold structure is constructed to provide gradual turns, thereby eliminating eddies and other objectionable resistances to the flow of fuel therethrough, which obviously tend to upset the equilibrium of the combustible fluid.

A still further feature of my invention is illustrated in the drawings and more particularly in Figures 14 and 14^A which illustrate how the fuel mixture is uniformly spread over the floor or roof portions of the manifold header. For example at high engine speeds, the wet particles of fuel mixture 50 tend to collect on the roof portion 51 of the manifold structure immediately above the riser 13 and movement is induced thereto by the current of vaporized fuel in the manifold to move these wet particles 50 towards the shoulder 52 intermediate the roof portion 51 and lateral header portions or runners 53 of the header 14. The edge of the shoulder 52 is slightly rounded as at 54 thereby permitting the force which moves said wet particles to pull the heavier globules over this rounded edge and spread the fuel mixture in a film 49 over the roof of runner portion, said film being spread in a film of substantially uniform thickness. The rounded edge 53 of the shoulder 52 prevents the film from breaking away from the wall or becoming stratified, such stratification causing an unequal relative distribution of the fuel mixture transversely of the manifold runner, and consequently the dividing means or "splits", which are constructed to divert predetermined portions of the film into the manifold branches, will not function properly. It is necessary to form a film of substantially uniform thickness and density over the roof of said manifold structure in order to effectively divide the fuel stream of wet particles moved along the roof at relatively high engine speeds.

A similar shoulder 55 having a rounded edge 56 is located on the floor of the manifold and is preferably formed at least on two sides of the riser outlet opening and disposed intermediate said opening and the lateral header portions or runners 53. In general manifold risers are circular in cross-section and the shoulder 55 forms a depressed floor portion 57 in which the riser opening is located, the riser bore and the depressed floor portion 57 intersect in a circular edge 58 which is preferably slightly rounded. At low engine speeds there is very little force for lifting the fuel up the riser and it has been noted that a large portion of the fuel mixture drawn into the engine at low speeds is in the globule form, said globules or fuel mixture particles being slowly moved up the riser wall to which they cling. However these individual particles do not have sufficient inertia to pass over the circular edge 58. When these particles reach the edge 58, they tend to creep around the edge in the direction as indicated by the arrows in Figure 14^A, such movement being induced by the fluid currents in said riser and manifold. Such particles will meet and join together as at 59, the mass of such particles becoming greater and thus they are subjected to an increased fluid friction and are spilled over the edge 58 onto the depressed floor 57 of the manifold, where the wet particles are moved along the floor longitudinally of the header in a stream having a relatively dense portion at the center of the header. In time, this stream tends to spread out but I have noted that with manifolds, the branches leading off from a point in line with the center of the manifold will receive a richer fuel mixture than the branches leading off from the outer and inner sides of the header. In order to eliminate this undesirable condition I have provided the shoulder 55 intermediate the riser and the lateral header portion or runner 53. This shoulder serves as a dam and causes the relatively narrow fuel mixture stream to spread out as shown in Figure 14^A and to form a film 60 of substantially uniform thickness on the floor 61 of the lateral header portion 53. Thus all branches, which lead off from the manifold header from the inner and outer sides thereof will receive the predetermined amount of the fuel flow which it was intended that they receive, thereby effecting a relative predetermined relative distribution of the fuel flow in the manifold branches.

It will thus be noted that I have provided a manifold structure which is constructed to effect an accurate distribution of the fuel to the engine cylinders for obtaining the maximum power and efficiency from the engine.

It will be apparent to those skilled in the art to which my invention pertains that various modifications and changes may be made without departing from the spirit of my invention or from the scope of the appended claims.

What I claim as my invention is:

1. In an internal combustion engine having a plurality of cylinders, an intake manifold structure having a plurality of branch portions adapted for communication with said cylinders, and fuel flow impeding means projecting respectively from the floor and roof of said manifold adjacent the mouth of one or more of said branch portions to effect a relative predetermined distribution of the fuel flow in said manifold branch portions respectively at relatively low and high engine speeds.

2. A method of distributing fuel in an intake manifold structure to a plurality of manifold branches communicating with the cylinders of an internal combustion engine consisting in spreading a fuel stream in a film of substantially uniform thickness over a wall of the manifold structure, and subsequently dividing said fuel stream for distribution into said branches.

3. A method of distributing fuel in an intake manifold structure to a plurality of manifold branches communicating with the cylinders of an internal combustion engine consisting in introducing a fuel stream of non-uniform thickness to a conducting portion, in spreading said non-uniform fuel stream in a film of substantially uniform thickness over a wall of the conducting portion, and subsequently dividing said fuel stream for distribution into said branches.

4. A method of distributing fuel in an intake manifold structure to a plurality of manifold branches communicating with the cylinders of an internal combustion engine and consisting in flowing a fuel film of non-uniform thickness into a distributing chamber, the spreading of said fuel film of non-uniform thickness over a wall of an adjacent communicating runner in a film of substantially uniform thickness, and subsequently dividing said fuel stream for distribution into said branches.

5. A method of distributing fuel in an intake manifold structure for distribution to a plurality of manifold branches communicating with the cylinders of an internal combustion engine consisting in introducing a fuel into the intake manifold structure in a manner tending to cause the fuel to flow in an unbalanced condition, then spreading the fuel over the floor of said manifold in a film of substantial uniform thickness, and subsequently dividing said fuel stream for distribution to said branches.

6. An intake manifold structure for an internal combustion engine including a primary fluid conducting portion, a lateral fluid conducting portion communicating with said first portion, said fluid including liquid fuel and fuel mixture and being introduced to said lateral portion from said primary portion in a manner tending to cause said fluid to flow in an unbalanced condition into said lateral portion, a plurality of branch conducting portions for connecting said lateral conducting portion with the engine and branched from said lateral conducting portion at a common junction, and fluid dividing means at the junction facing the fluid flowing through said lateral conducting portion to divide the fluid for distribution in separate streams to said branch portions, said lateral conducting portion including a chamber constructed to provide means acting on the liquid fuel to establish same in a state of equilibrium, and further including a conduit extending intermediate said chamber and said branch portions, said conduit having a length sufficient to substantially establish equilibrium of the fuel mixture in said conduit prior to being acted upon by said fluid dividing means.

7. An intake manifold structure for an internal combustion engine including a primary fluid conducting portion, a lateral fluid conducting portion communicating with said first portion, said fluid including liquid fuel and fuel mixture and being introduced to said lateral portion from said primary portion in a manner tending to cause said fluid to flow in an unbalanced condition into said lateral portion, a plurality of branch conducting portions for connecting said lateral conducting portion with the engine and branched from said lateral portion at a common junction, and fluid dividing means at the junction facing the fluid flowing through said lateral portion to divide the fluid for distribution in separate streams to said branch portions, said lateral conducting portion including a chamber constructed to provide means acting on the liquid fuel to establish same in a state of equilibrium, and further including a conduit extending longitudinally of the engine, said conduit being closed intermediate said chamber and said branch conducting portions and having a length sufficient to substantially establish equilibrium of the fuel mixture in said conduit prior to being acted upon by said fluid dividing means.

8. An intake manifold structure for an internal combustion engine including a primary fluid conducting portion, a lateral fluid conducting portion communicating with said first portion, said fluid including liquid fuel and fuel mixture and being introduced to said lateral portion from said primary portion in a manner tending to cause said fluid to flow in an unbalanced condition into said lateral portion, a plurality of branch conducting portions for connecting said lateral conducting portion with the engine and branched from said lateral portion at a common junction, and fluid dividing means at the junction facing the fluid flowing through the lateral portion to divide the fluid for distribution in separate streams to said branch portions, said lateral conducting portion including a chamber constructed to provide means acting on the liquid fuel to establish same in a state of equilibrium, and further including a conduit extending longitudinally of the engine, said conduit having a substantial uniform cross-sectional area intermediate said chamber and said branch conducting portions and having a length sufficient to substantially establish equilibrium of the fuel mixture in said conduit prior to being acted upon by said fluid dividing means.

9. An intake manifold structure for an internal combustion engine including a primary fluid conducting portion, a lateral fluid conducting portion communicating with said first portion, said fluid including liquid fuel and fuel mixture and being introduced to said lateral portion from said primary portion in a manner tending to cause said fluid to flow in an unbalanced condition into said lateral portion, a plurality of branch conducting portions communicating with and branched from said lateral conducting portion at a common junction, and fluid dividing means at the junction facing the fluid flowing through the lateral portion to divide the fluid for distribution in separate streams to said branch portions, said lateral conducting portion including a chamber constructed to provide a shoulder acting on the liquid fuel as the same flows over the shoulder to establish same in a state of equilibrium, and further including a conduit extending longitudinally of the engine beyond the shoulder, said conduit having a substantial uniform cross-sectional area intermediate said chamber and said branch conducting portions, said conduit being closed intermediate said chamber and said branch conducting portions, said conduit having a length sufficient to substantially establish equilibrium of the fuel mixture in said lateral portion prior to being acted upon by said fluid dividing means.

10. An intake manifold structure for an internal combustion engine including a primary fluid conducting portion, a lateral fluid conducting portion communicating with said first portion, said fluid including liquid fuel and fuel mixture and being introduced to said lateral portion from said primary portion in a manner tending to cause said fluid to flow in an unbalanced condition into said lateral portion, a plurality of branch conducting portions communicating with and branched from said lateral conducting portion at a common junction, and fluid dividing means at the junction facing the fluid flowing through the lateral portion to divide the fluid for distribution in separate streams to said branch portions, said lateral conducting portion including a chamber at the junction of said primary and lateral conducting portions and further including a closed conduit intermediate the chamber and said branch conducting portions, said structure further including a shoulder extending transverse of the lateral portion and located intermediate the chamber and conduit for acting on the liquid fuel as the same flows over the shoulder to establish same in a state of equilibrium, said conduit having a length sufficient to substantially establish equilibrium of the fuel mixture prior to being acted upon by said fluid dividing means.

11. An intake manifold structure for an internal combustion engine including a primary fuel mixture conducting portion, a lateral fuel mixture conducting portion communicating with said first portion, a plurality of branch conducting portions for connecting said lateral conducting portion with the engine, and fluid dividing means adjacent the junction of said branch conducting portions with said lateral conducting portion for distributing the fluid to said branch portions, said lateral conducting portion including a chamber constructed to provide means acting on the liquid fuel to establish same in a state of equilibrium, and a conduit extending intermediate said chamber and said first branch, said conduit having a length permitting the fuel mixture flow to attain equilibrium prior to being acted upon by said fluid dividing means, and liquid fuel flow controlling means at the mouth of one of said branch conducting portions for providing additional liquid fuel distributing means.

12. An intake manifold structure for an internal combustion engine including a primary fuel mixture conducting portion, a lateral fuel mixture conducting portion communicating with said first portion, a plurality of branch conducting portions for connecting said lateral conducting portion with the engine, and fluid dividing means adjacent the junction of said branch conducting portions with said lateral conducting portion for distributing the fluid to said branch portions, said lateral conducting portion including a chamber constructed to provide means acting on the liquid fuel to establish same in a state of equilibrium, and a conduit extending intermediate said chamber and said first branch, said conduit having a length permitting the fuel mixture flow to attain equilibrium prior to being acted upon by said fluid dividing means, and a dam extending across the mouth of one of said branch conducting portions and cooperating with said fluid flow dividing means for further controlling the distribution of said liquid fuel.

13. An intake manifold structure for an internal combustion engine including a primary fuel mixture conducting portion, a lateral fuel mixture conducting portion communicating with said first portion, a plurality of branch conducting portions for connecting said lateral conducting portion with the engine, fluid dividing means adjacent the junction of said branch conducting portions with said lateral conducting portion for distributing the fluid to said branch portions, said lateral conducting portion including a chamber constructed to provide means acting on the liquid fuel to establish same in a state of equilibrium, and a conduit extending intermediate said chamber and said first branch, said conduit having a length permitting the fuel mixture flow to attain equilibrium prior to being acted upon by said fluid dividing means, and means cooperating with said fluid flow dividing means and acting on the liquid fuel for further controlling the distribution of said liquid fuel.

14. An intake manifold structure for an internal combustion engine including a primary fuel mixture conducting portion, a lateral fuel mixture conducting portion communicating with said first portion, a plurality of branch conducting portions for connecting said lateral conducting portion with the engine, fluid dividing means adjacent the junction of said branch conducting portions with said lateral conducting portion for distributing the fluid to said branch portions, said lateral conducting portion including a chamber constructed to provide means acting on the liquid fuel to establish same in a state of equilibrium, and a conduit extending intermediate said chamber and said first branch, said conduit having a length permitting the fuel mixture flow to attain equilibrium prior to being acted upon by said fluid dividing means, said conducting portions having substantially flat floors, and a dam projecting from the floor of said structure adjacent the mouth of one or more of said branch conducting portions for impeding liquid fuel flow into said branch portion whereby to effect a relative predetermined quantity distribution of the liquid fuel to said branch conducting portions.

15. An intake manifold structure for an internal combustion engine including a primary fuel mixture conducting portion, a lateral fuel mixture conducting portion communicating with said first portion, a plurality of branch conducting portions for connecting said lateral conducting portion with the engine, fluid dividing means adjacent the junction of said branch conducting portions with said lateral conducting portion for distributing the fluid to said branch portions, said lateral conducting portion including a chamber constructed to provide means acting on the liquid fuel to establish same in a state of equilibrium, and a conduit extending intermediate said chamber and said first branch, said conduit having a length permitting the fuel mixture flow to attain equilibrium prior to being acted upon by said fluid dividing means, said conducting portions having substantially flat floors, and a dam projecting from the floor of said structure and extending across the mouth of one of said branch conducting portions for impeding liquid fuel flow into said branch portion whereby to effect a relative predetermined quantity distribution of the liquid fuel to said branch conducting portions.

HAROLD H. TIMIAN.